United States Patent
Ding et al.

(10) Patent No.: US 10,681,255 B2
(45) Date of Patent: Jun. 9, 2020

(54) HOLDER FOR CAMERA MODULE AND CAMERA MODULE WITH HOLDER

(71) Applicant: TRIPLE WIN TECHNOLOGY(SHENZHEN) CO.LTD., Shenzhen (CN)

(72) Inventors: Sheng-Jie Ding, Guangdong (CN); Shin-Wen Chen, New Taipei (TW); Jing-Wei Li, Guangdong (CN); Jian-Chao Song, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/289,005

(22) Filed: Feb. 28, 2019

(65) Prior Publication Data

US 2020/0137272 A1    Apr. 30, 2020

(30) Foreign Application Priority Data

Oct. 31, 2018    (CN) .......................... 2018 1 1290389

(51) Int. Cl.
*H04N 5/225* (2006.01)

(52) U.S. Cl.
CPC ......... *H04N 5/2254* (2013.01); *H04N 5/2253* (2013.01)

(58) Field of Classification Search
CPC .. H04N 5/2253; H04N 5/2254; H04N 5/2251; H04N 5/2257; G03B 17/55

USPC ................................................. 348/345–352
See application file for complete search history.

(56) References Cited

U.S. PATENT DOCUMENTS

| 2012/0229701 | A1* | 9/2012 | Pavithran | H04N 5/2252 348/374 |
| 2014/0184902 | A1* | 7/2014 | Chen | H04N 5/2253 348/374 |
| 2017/0330847 | A1* | 11/2017 | Dobashi | G02B 7/02 |

FOREIGN PATENT DOCUMENTS

| CN | 206497881 U | 9/2017 |
| CN | 206741174 U | 12/2017 |

* cited by examiner

*Primary Examiner* — Yogesh K Aggarwal
(74) *Attorney, Agent, or Firm* — ScienBiziP, P.C.

(57) ABSTRACT

A holder for a camera module includes first and second surfaces, an optical filter receiving groove is recessed from the first surface to the second surface to form a step portion and a glue receiving portions extend from angled abutments of the step portion. A sensor receiving groove is recessed from the second surface to the first surface, and the sensor receiving groove communicates with the optical filter receiving groove. At least one escape passage is defined in the holder, the at least one escape passage communicates with the optical filter receiving groove and the sensor receiving groove. The at least one escape passage abuts the glue receiving portions and provides an escape path for captured moisture and gases expanding or shrinking because of temperature variations.

16 Claims, 6 Drawing Sheets

HOLDER FOR CAMERA MODULE AND CAMERA MODULE WITH HOLDER

FIELD

The subject matter of the application generally relates to imaging devices.

BACKGROUND

Most camera modules have a lens, an image-focus motor, a filter, a sensor chip, a plastic holder, and a circuit board. Currently, the plastic holder is mounted to the circuit board by optical adhesives. The plastic holder is heated, at least one escape hole or escape groove is necessary for dissipating gases and heat.

The plastic holder and optical adhesives have hygroscopicity, so the plastic holder and the optical adhesives absorb moisture in a high temperature and high humidity environment. The heat generated by the camera separates the moisture from the plastic holder and the optical adhesives. But if the separated moisture cannot escape from an outlet into the external environment it will condense on the surface of the filter to form small droplets, the small droplets will affect the image quality of the camera module. Thus, moisture needs to be expelled through the escape groove. Conventional escape groove reduces adhesive area of the adhesive between the filter and the plastic holder, which may affect the reliability of the camera module and increases risk of rupture of the filter if the camera module is impacted.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
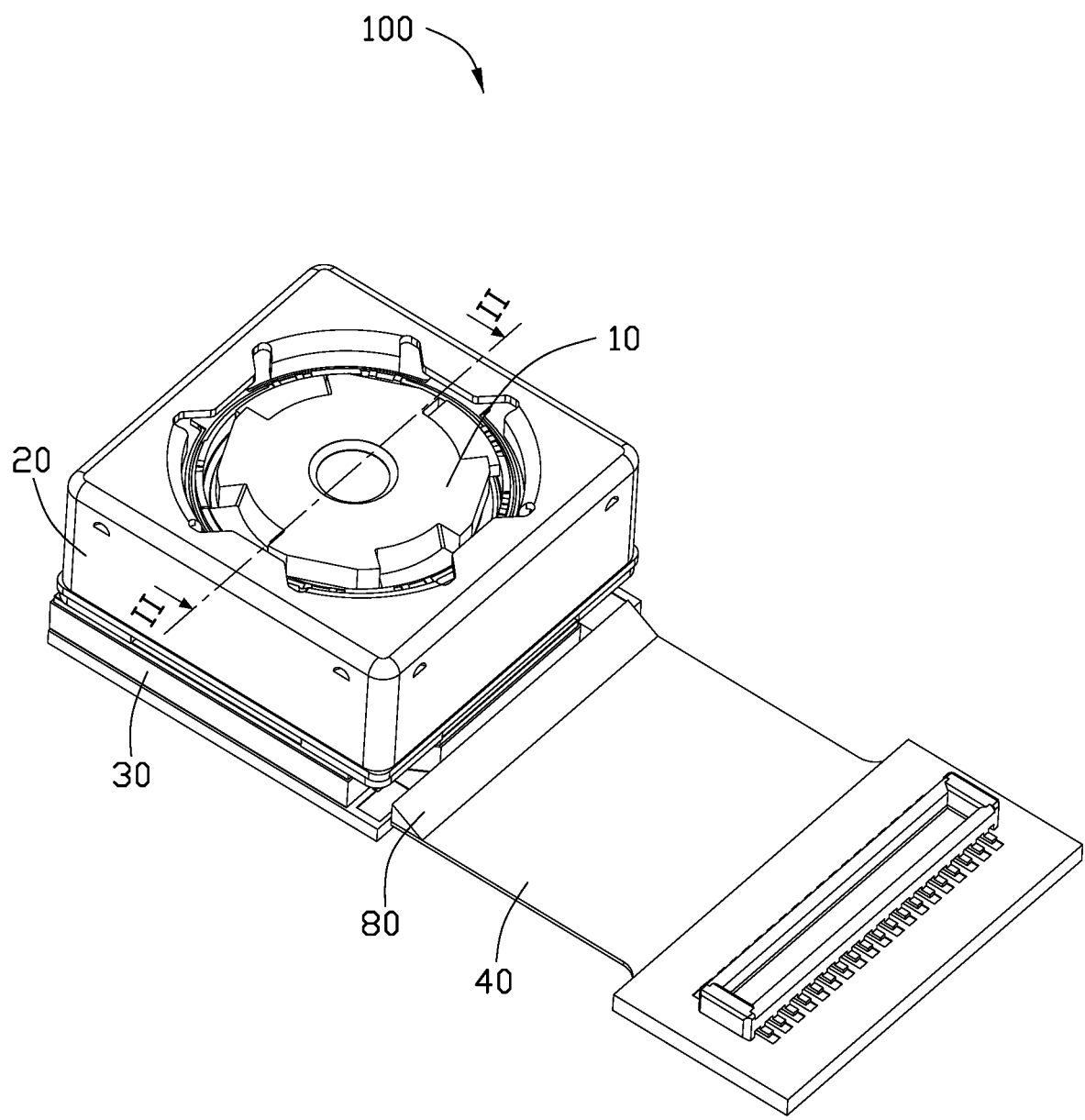
FIG. 1 is a perspective view of a first embodiment of a camera module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIGS. 1-6 show a camera module 100. The camera module 100 is used in an electronic device (not shown). The electronic device may be a smart phone, a tablet computer, or the like.

In at least one embodiment, the camera module 100 is an autofocus camera module. In other embodiments, the camera module 100 also can be a fixed focus camera module.

Figure 2:
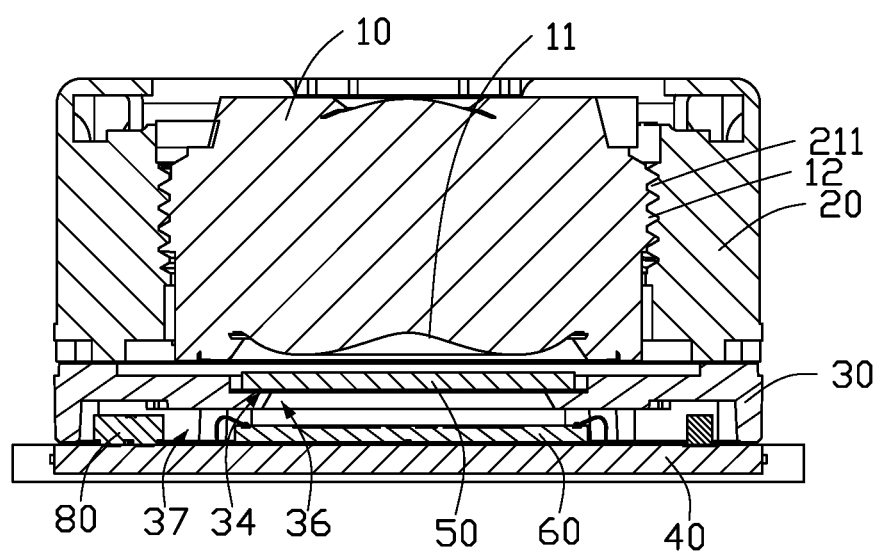
FIG. 2 is a cross-section view along line II-II of FIG. 1.
Figure 3:
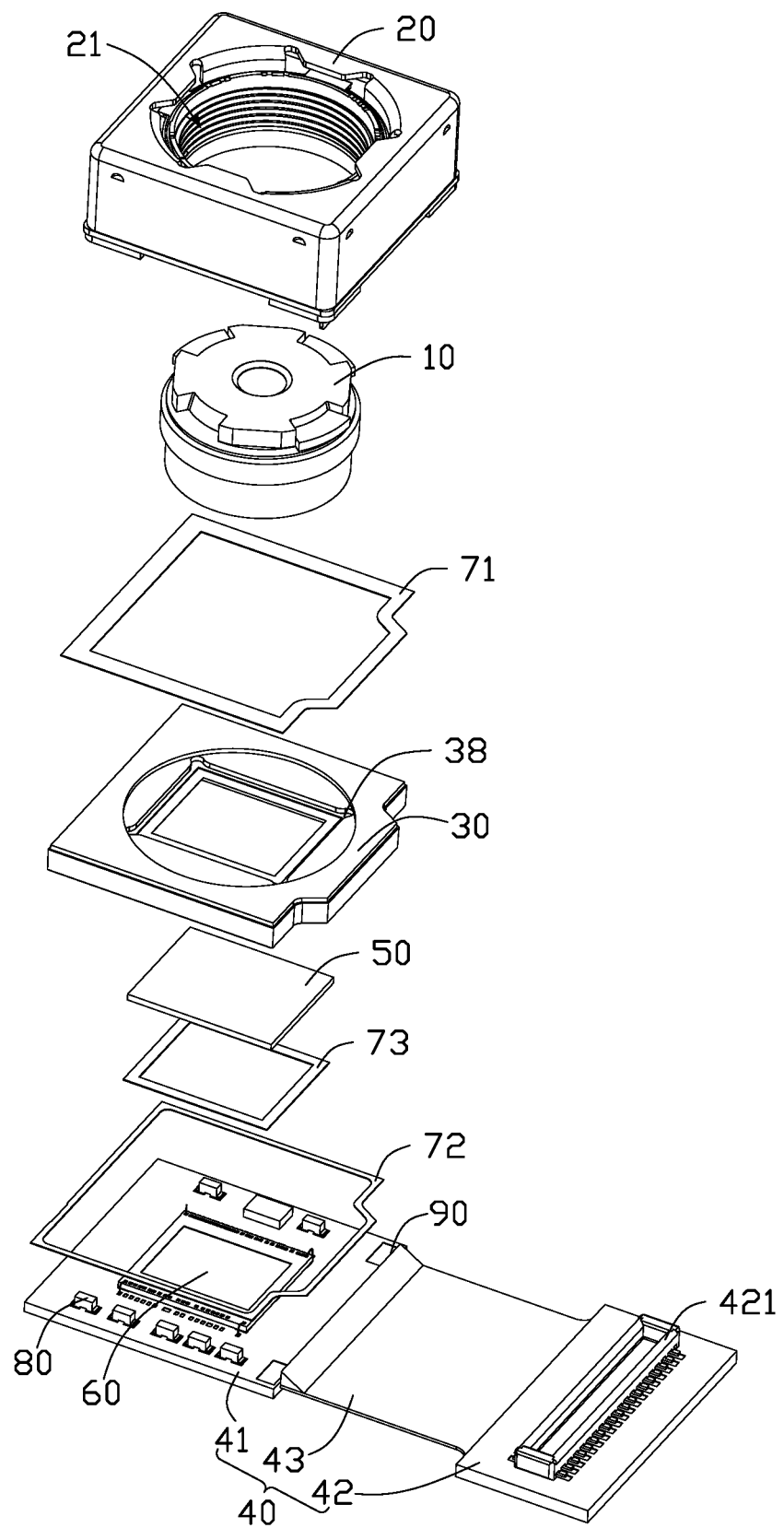
FIG. 3 is an exposed view of the camera module of FIG. 1.
Figure 4:
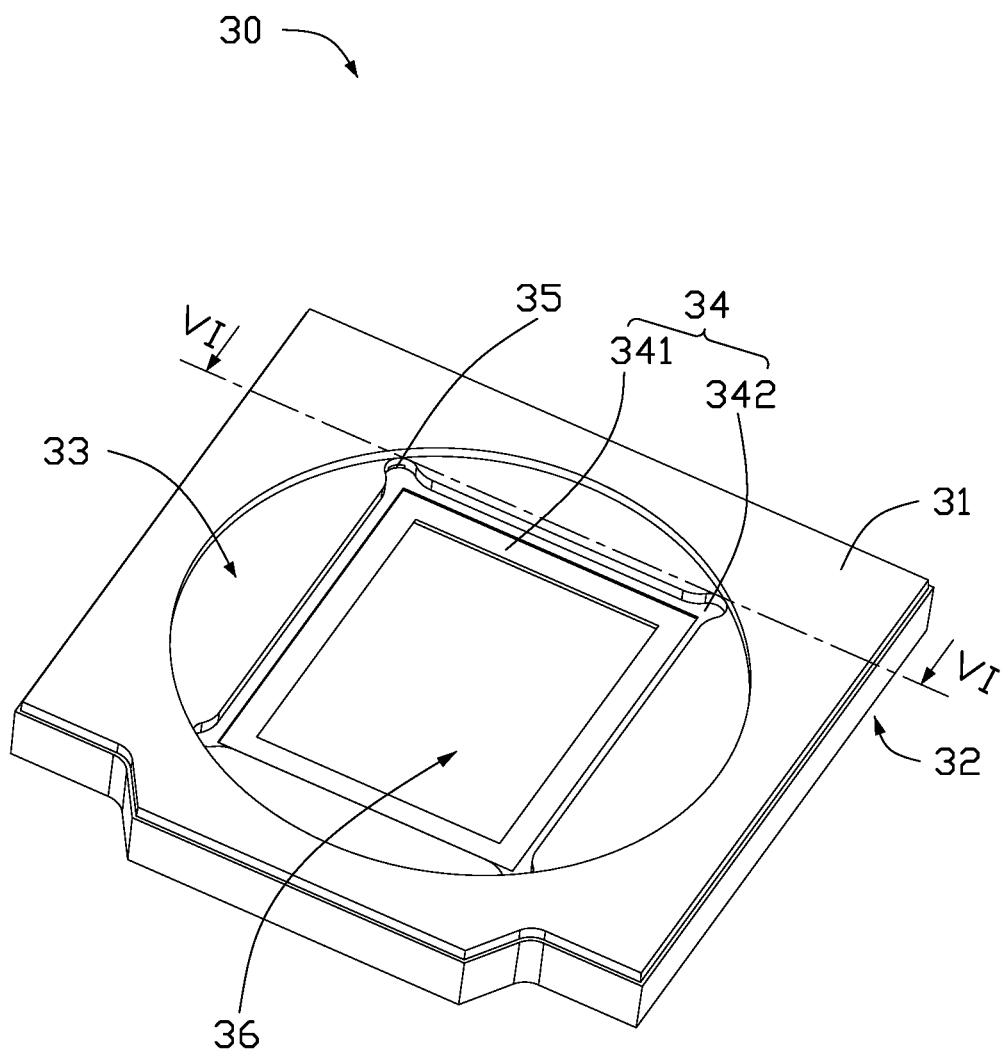
FIG. 4 is a perspective view of a holder of the camera module of FIG. 3.
Figure 5:
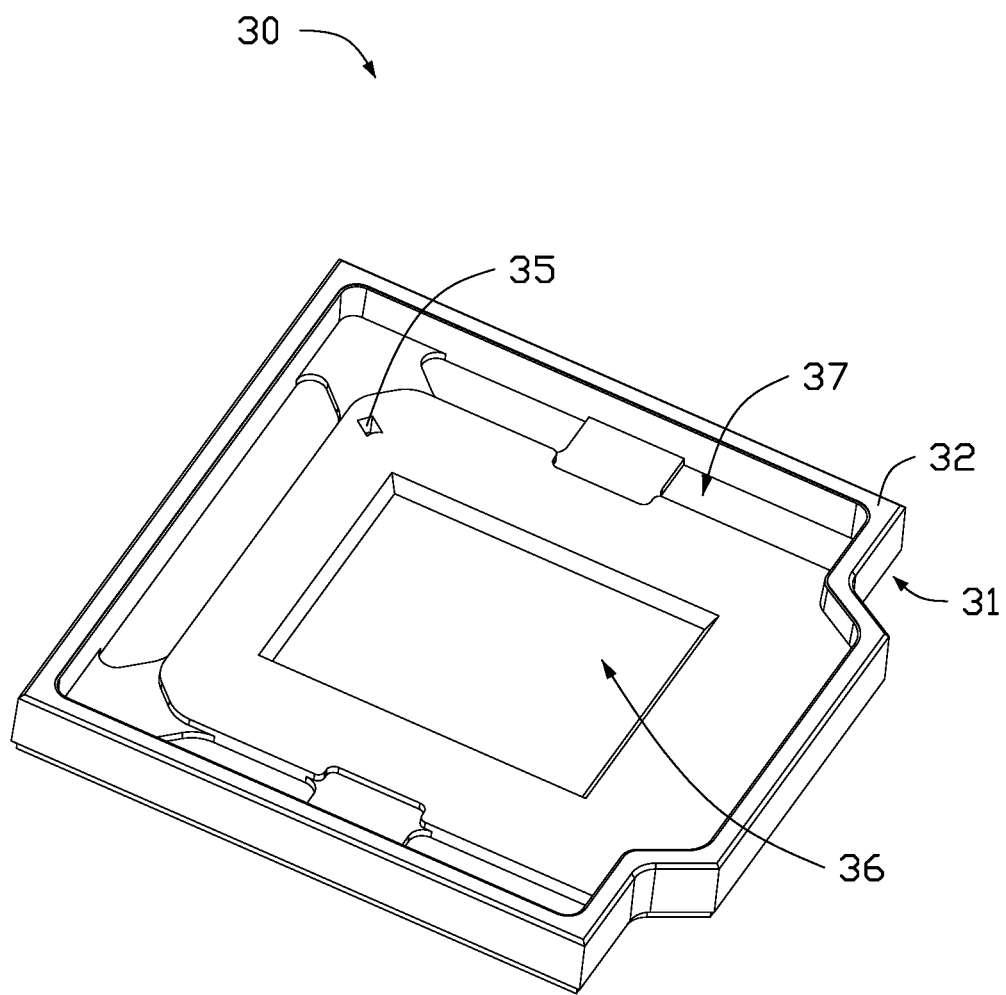
FIG. 5 is a perspective view of the holder of the camera module of FIG. 4 from another angle.
Figure 6:
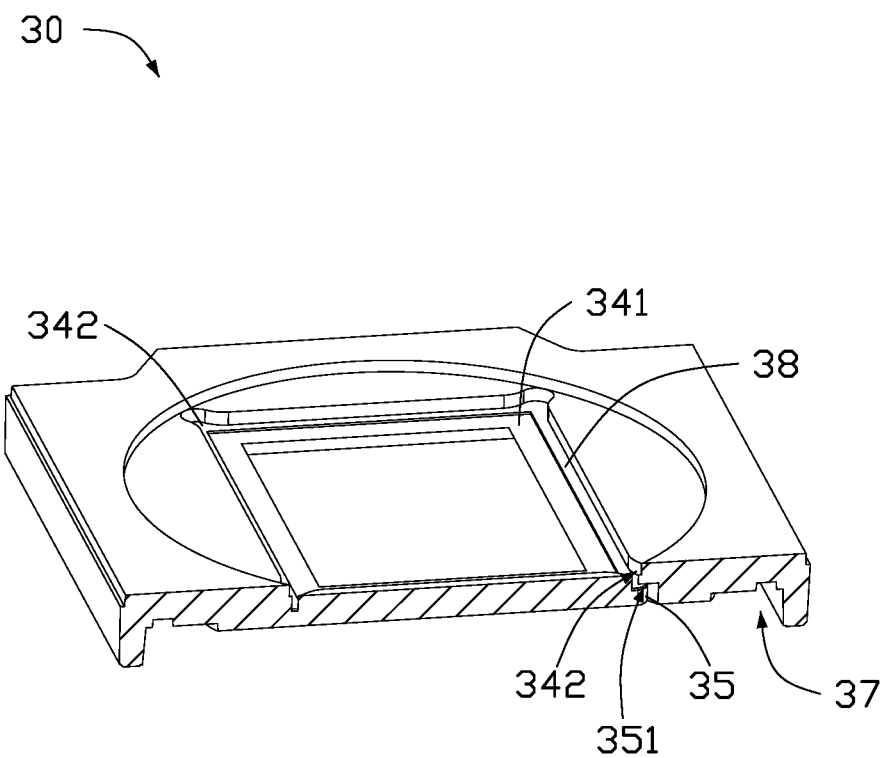
FIG. 6 is a cross-section view along line VI-VI of FIG. 4.

FIGS. 1-2, the camera module 100 includes a lens 10, a voice coil motor 20, a holder 30, a printed circuit board 40, an optical filter 50, and a sensor 60. The lens 10 is received in the voice coil motor 20. The voice coil motor 20 is mounted on the holder 30. The holder 30 is fixed on the printed circuit board 40. The optical filter 50 is received and fixed in the holder 30. The sensor 60 is received in the holder 30 and electrically communicates with the printed circuit board 40.

The lens 10 includes an ophthalmic lens 11. A plurality of external threads 12 is defined on an external wall of the lens.

The voice coil motor 20 includes a lens receiving groove 21. The lens 10 is received in the lens receiving groove 21. A plurality of internal threads 211 is defined on an internal wall of the lens receiving groove 21. The plurality of internal threads 211 matches with the plurality of external threads 12 to fix the lens in the lens receiving groove 21. The voice coil motor 20 drives the lens 10 in and out to achieve focusing to make the image clearer.

The holder 30 supports the voice coil motor 20, and carries the optical filter 50 and the sensor 60.

The holder 30 is substantially square.

The holder 30 is fixed on the printed circuit board 40 by a first adhesive layer 71. The first adhesive layer 71 has a good thermal dissipation performance.

The holder 30 includes a first surface 31 and a second surface 32 opposite to the first surface 31. A step groove 33 is recessed from the first surface 31 to the second surface 32. The step groove 33 abuts on the peripheral edge of the holder 30 and faces the lens 10. Since the voice coil motor 20 is fixed on the holder 30 by the first adhesive layer 71, the first adhesive layer 71 may overflow when compressed. The step groove 33 receives the overflowing glue and prevents the overflowing glue from flowing to the peripheral edge of the holder 30, thereby avoiding adverse effects caused by the overflowing glue. The stepped groove 33 of the present disclosure not only saves cost but also improves production quality.

In at least one embodiment, the step groove 33 is circular. In other embodiment, the step groove 33 also can be annular.

An optical filter receiving groove 34 is formed on the holder 30.

In at least one embodiment, the optical filter receiving groove 34 is formed on the holder 30, from a bottom of the step groove 33 to the second surface 32. The step groove 33 is circular. A bottom of the optical filter receiving groove 34 is below the bottom of the step groove 33.

In other embodiment, the optical filter receiving groove 34 can be formed from the first surface 31 to the second surface 32. The step groove 33 also can be annular and surrounding the optical filter receiving groove 34.

The optical filter receiving groove 34 includes a step portion 341 and a plurality of glue receiving portions 342. The plurality of glue receiving portions 342 extends from a plurality of angled abutments of the step portion 341 toward a side wall of the step groove 33.

In at least one embodiment, the step portion 341 is square, number of the plurality of glue receiving portions 342 is four, and each of the glue receiving portions 342 has a shape of a semicircle.

The step portion 341 is used to fix the optical filter 50. The optical filter 50 is fixed on the step portion 341 by a second adhesive layer 72. The second adhesive layer 72 may overflow when pressed. The overflow glue will flow into the glue receiving portions 342. So, the glue receiving portions 342 prevent the overflowing glue from reaching the optical filter 50, to improve production quality.

An opening defined by the step portion 341 has are greater than an area of the optical filter 50.

The second adhesive layer 72 has a good thermal dissipation performance.

A sensor receiving groove 37 is formed on the holder 30 from the second surface 32 to the first surface 31. The sensor receiving groove 37 communicates with the optical filter receiving groove 34 by a first through hole 36. That is, the first through hole 36 passes through the bottom of the step portion 341 and the bottom of the sensor receiving groove 37.

A dustproof glue 38 is applied between the optical filter 50 and a side wall of the optical filter receiving groove 34. In at least one embodiment, the dustproof glue 380 is applied annularly. The dustproof glue 38 prevents debris, dust, and the like from entering the interior of the camera module 100.

At least one escape passage 35 is defined at the holder 30 from the bottom of the sensor receiving groove 37 to the optical filter receiving groove 34. The at least one escape passage 35 communicates with the optical filter receiving groove 34 and abuts the plurality of glue receiving portions 342. In at least one embodiment, the at least one escape passage 35 communicates with the optical filter receiving groove 34 by a second through hole 351.

A depth of the escape passage 35 is greater than sum of depth of the first through hole 36 and thickness of the dustproof glue 38. The escape passage 35 is thus connected to the optical filter receiving groove 34 after the dustproof glue 38 is applied between the optical filter 50 and the side wall of the optical filter receiving groove 34, so that moisture and expanded air can be dissipated out from the escape passage 35, the second through hole 351, the optical filter receiving groove 34, and the lens receiving groove 21.

The escape passage 35 does not affect the adhesive area of the second adhesive layer 72, therefore, the escape passage 35 enhances the reliability of the camera module 100 and reduces risk of damage to the optical filter 50 if the camera module 100 is dropped.

The printed circuit board 40 may be a ceramic substrate, a flexible printed circuit board, a rigid printed circuit board, a rigid-flex printed circuit board, or the like. In at least one embodiment, the printed circuit board 40 is a rigid-flex printed circuit board. The printed circuit board 40 includes a first rigid portion 41, a second rigid portion 42, and a flexible portion 43. The flexible portion 43 is located between the first rigid portion 41 and the second rigid portion 42. The sensor 60 is mounted on the first rigid portion 41. The holder 30 is mounted on the first rigid portion 41.

An electrical connection portion 421 is further mounted on the second rigid portion 42. The electrical connection portion 421, the electronic components 80, and the sensor 60 may be located on a same surface of the circuit board 40. The electrical connection portion 421 may be a connector or an edge connector (gold fingers).

The optical filter 50 cuts out stray light entering into the camera module 100. The optical filter 50 is fixed on the step portion 341. Parts of the optical filter 50 is exposed from the first through hole 36. The optical filter 50 faces the ophthalmic lens 11.

The sensor 60 is mounted on the printed circuit board 40 and received in the sensor receiving groove 37. The sensor 60 faces the optical filter 50. The sensor 60 electrically communicates with the printed circuit board 40.

The camera module 100 further includes a plurality of electronic components 80. The plurality of electronic components 80 is mounted on the first rigid portion 41 of the printed circuit board 40 and surrounds the sensor 60. The electronic components 80 can be components such as a resistor, a capacitor, a diode, a transistor, a relay, or an electrically erasable programmable read only memory (EEPROM).

The camera module 100 further includes a reinforced adhesive 90. The reinforced adhesive 90 bonds the holder 30 and the printed circuit board 40 to enhance the mechanical strength of the camera module 100. The reinforced adhesive 90 can be a heat-conducting adhesive.

With the embodiments described above, at least one escape passage 35 communicates with the optical filter receiving groove 34 and abuts the glue receiving portions 342. Not only does escape passage 35 provide a dissipation path for the moisture and hot air, but also can enhance the reliability of the camera module 100 and can reduce the risk of damage to the optical filter 50 when the camera module 100 is dropped.

The embodiments shown and described above are only examples. Many details are often found in the art such as the other features of a holder and a camera module with the holder. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A holder for camera module comprising:
   a first surface and a second surface opposite to the first surface, an optical filter receiving groove recessed from the first surface to the second surface to form a step portion and glue receiving portions extending from angled abutments of the step portion;
   a sensor receiving groove recessed from the second surface to the first surface, and the sensor receiving groove communicating with the optical filter receiving groove; and
   at least one escape passage defined in the holder, wherein the at least one escape passage communicates with the optical filter receiving groove and the sensor receiving groove; the at least one escape passage abutting the glue receiving portions.

2. The holder of claim 1, wherein the step portion is configured for an optical filter to be attached thereon, the holder further comprises a dustproof glue, the dustproof glue is applied between the optical filter and a side wall of the optical filter receiving groove.

3. The holder of claim 2, wherein the sensor receiving groove communicates with the optical filter receiving groove by a first through hole.

4. The holder of claim 3, wherein a depth of the escape passage is greater than a sum of a depth of the first through hole and a thickness of the dustproof glue.

5. The holder of claim 1, wherein the at least one escape passage communicates with the optical filter receiving groove by a second through hole.

6. The holder of claim 1, wherein a step groove is recessed from the first surface to the second surface, the step groove abuts on the peripheral edge of the holder.

7. The holder of claim 6, wherein the optical filter receiving groove is recessed from a bottom of the step groove to the second surface.

8. A camera module, comprising:
a holder, the holder comprising:
a first surface and a second surface opposite to the first surface, an optical filter receiving groove recessed from the first surface to second surface to form a step portion and glue receiving portions extending from angled abutments of the step portion;
a sensor receiving groove recessed from the second surface to the first surface, and the sensor receiving groove communicating with the optical filter receiving groove; and
at least one escape passage defined in the holder, the at least one escape passage communicating with the optical filter receiving groove and the sensor receiving groove; the at least one escape passage abutting the glue receiving portions; and
an optical filter, the optical filter is fixed on the step portion.

9. The camera module of claim 8, wherein the camera module further comprises a printed circuit board and a sensor, the sensor is received in the sensor receiving groove, faces the optical filter and electrically communicated with the printed circuit board; the holder is fixed on the printed circuit board.

10. The camera module of claim 8, wherein the camera module further comprises lens, and a voice coil motor; the voice coil motor is mounted on the holder, the lens is received in the voice coil motor.

11. The camera module of claim 8, wherein the step portion configured for an optical filter to be attached thereon, the holder further comprises a dustproof glue, the dustproof glue is applied between the optical filter and a side wall of the optical filter receiving groove.

12. The camera module of claim 11, wherein the sensor receiving groove communicates with the optical filter receiving groove by a first through hole.

13. The camera module of claim 12, wherein a depth of the escape passage is greater than a sum of a depth of the first through hole and a thickness of the dustproof glue.

14. The camera module of claim 8, wherein the at least one escape passage communicates with the optical filter receiving groove by a second through hole.

15. The camera module of claim 8, wherein a step groove is recessed from the first surface to the second surface, the step groove abuts on the peripheral edge of the holder.

16. The camera module of claim 15, wherein the optical filter receiving groove is recessed from a bottom of the step groove to the second surface.

* * * * *